United States Patent Office 2,837,520
Patented June 3, 1958

2,837,520
FLUORESCENT MATERIALS ON THE BASIS OF TETRAZOINDENES

Raffaello Fusco and Silvano Rossi, Milan, Italy, assignors to Industria Chimica Profarmaco S. r. l., Milan, Italy No Drawing. Application April 10, 1956
Serial No. 577,203

Claims priority, application Italy May 26, 1955

14 Claims. (Cl. 260—249.5)

This invention relates to a new class of organic substances having valuable fluorescent properties and to the preparation and use of such substances.

According to the present invention there are provided a class of substances of the general formula

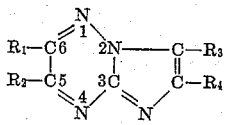

where $R_1$, $R_2$, $R_3$ and $R_4$ are hydrogen atoms, alkyl groups or substituted or unsubstituted aryl (preferably phenyl) groups. The said compounds are the (2.3:2′.3′) imidazole-1:2:4-triazines, or tetrazoindenes.

According to a further feature of the invention compounds of the said general formula are prepared by reacting a 3-amino- 1:2:4-triazine of the general formula

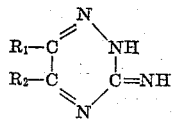

with an α-halocarbonyl compound of the general formula

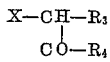

where $R_1$, $R_2$, $R_3$ and $R_4$ have the meanings assigned to them above and X is a halogen atom such as chlorine or bromine. A molecule of hydrochloric acid HX and of water are eliminated in the reaction.

It has, further, been observed that when at least two of the four constituents are alkyl groups, the products show in the crystal state a luminosity and brightness of tone that render them usable as luminous pigments, when suitably formulated, for application to paper, fabrics, metals, wood or resins and generally to any material it may be desired to cover with a coloured luminous coating.

It has further been observed that the products of the present invention, when dissolved in suitable solvents, even in an extremely diluted solution, show an intense fluorescence that can be exploited for practical or decorative purposes. It is, particularly, possible to dissolve the said compounds in thermoplastic resins by the standard technique employed for colouring polystyrol; or, further, to dissolve the said products in monomers before their polymerisation, thus obtaining fluorescent polymer masses and objects.

The products of the invention are further characterised by other valuable properties; they are, in fact, highly heat-resistant, chemically rather inert and withstand the prolonged action of water, atmosphere and light, which qualities render them highly suitable for practical usage such as the colouration under heat of polystryrol resins, for application to advertising bills, to sign boards and the like and generally for all the usages requiring stability to the above-mentioned factors.

The products are generally of various yellow shades, sometimes with yellowish reflections; they melt at high temperatures and are insoluble in water, alkalis and acids, but are soluble in many organic solvents. In very diluted acetone solution they show an intense yellow fluorescence, tending to yellow-green or azure-green dependent on the substituents present in the molecule.

In practical use the compounds of the present invention can be incorporated, alone or mixed with other pigments or dyestuffs into thermoplastic resins, such as polystyrol and drawn through dies in order to obtain colcuration and fluorescence effects in the resin; the same effects can be obtained by polymerising acrylic or vinyl monomers and the like into which the fluorescent substance has been previously dissolved.

Another form of practical application of the products of the present invention consists in their employment for the preparation of pastes, varnishes, enamels and the like for covering sheets, objects, fibres of various materials such as paper, fabrics, wood, metal, leather, and the like with a luminous, coloured and brilliant layer. It will be understood that the products in question can if desired be mixed with pigments and/or dyestuffs in order to achieve the desired effects and tones.

The compounds are preferably prepared by heating the reagents referred to above, in admixture, to temperatures of 50° to 200° C. The reaction can conveniently be effected in the presence of a common solvent, such as an aliphatic alcohol, a ketone, an ester or other solvent chemically inert with respect to both of the reagents.

The reaction can also be carried out in the presence of a binding agent for the hydrohalic acid formed in the reaction. However the said acid binding agent should not exert any chemical action upon the halo-carbonyl compound. Particularly suitable acid binding agents are for instance the carbonates of the alkaline earth metals, such as calcium, strontium, barium and magnesium carbonates, sodium bicarbonate, the phosphates and in general salts of weak acids, which are inert with respect to the halo carbonyl compound.

Suitable 3-amino(1:2:4)triazines as starting materials are, for instance, 5-phenyl-3-amino(1:2:4)triazine and 5,6-diphenyl-3-amino(1:2:4)triazine.

Suitable α-halocarbonyl compounds are, for instance, ω-bromo-acetophenone, ω-bromo-P-nitro-aceptophenone, α-bromo phenyl-acetaldehyde and desyl chloride.

The following examples will serve to illustrate the invention but are not to be regarded as limiting it in any way.

Example I 2 g. of 5-phenyl-3-amino(1:2:4)triazine are dissolved in 50 cc. boiling ethanol, and 2.6 g. phenacyl bromide are added. The solution is boiled under reflux for an hour and is then allowed to cool. The crystalline yellow product formed is collected upon a filter and re-crystallized from ethanol. The product is 5:5′-diphenyl (2.3:2′.3′)imidazole(1:2:4)triazine. (Referring to the formula given above, $R_1$ and $R_3$ are hydrogen and $R_2$ and $R_4$ are phenyl groups.)

Example II

From 3.5 g. 5-phenyl-3-amino(1:2:4)triazine and 5 g. p-nitro ω-bromoacetophenone there is obtained by the procedure described in Example I a brick-red product which by subsequent heating is transformed into a yellow compound having a melting point of 258° C. (after crystallisation from pyridine). This compound is 5′-p-nitro-phenyl-5-phenyl(2.3:2′.3′)imidazole(1:2:4) triazine. (Referring to the formula given above, $R_1$ and $R_3$ are hydrogen, $R_2$ is phenyl and $R_4$ is p-nitrophenyl.)

Example III 8 g. 5:6-diphenyl-3-amino(1:2:4)triazine are added to 6.5 g. ω-bromo-acetophenone in 40 cc. of normal butyl alcohol, and heated under reflux for an hour. The solution is dried under reduced pressure and the residue crystallised from ethanol. The crystalline yellow compound obtained can be further purified by crystallisation from ethyl acetate, from which it separates in the form of bright crystals. The product is 5:5':6-triphenyl (2.3:2'.3')imidazole(1:2:4)triazine. (Referring to the formula given above $R_1$, $R_2$ and $R_4$ are phenyl groups and $R_3$ is hydrogen.)

Example IV 8 g. of 5:6-diphenyl-3-amino(1:2:4)triazine are suspended in 50 cc. ethyl alcohol and 6.5 g. ω-bromo-acetophenone and about 1 g. calcium carbonate are added. The suspension is boiled under reflux for two hours, diluted with 100 cc. water and filtered. The residue is washed with diluted HCl and crystallised from alcohol or ethyl acetate. The same product as that described in Example III is obtained.

Example V 2.5 g. 5:6-diphenyl-3-amino(1:2:4)-triazine in 50 cc. iso-propyl alcohol are heated under reflux with 2.5 g. ω-bromoacetophenone. The reaction is complete in a short time (about one hour). After cooling, the separated solid is collected and re-crystallised from alcohol. Its melting point is 228°–229° C. The compound is 5'-p-nitrophenyl - 5:6 - diphenyl(2.3:2'.3')imidazole(1:2:4)triazine. (Referring to the formula given above, $R_1$ and $R_2$ are phenyl, $R_3$ is hydrogen and $R_4$ is p-nitrophenyl.)

Example VI 3.15 g. 5-phenyl-3-amino(1:2:4)triazine are heated under reflux for 6 hours with 2.3 g. desyl chloride and 60 cc. of alcohol. After cooling, the solution is filtered and concentrated to a small volume. The separated solid is filtered and purified by crystallisation from alcohol. Its melting point is 227° C. The product is 4':5':5-triphenyl(2.3:2'.3')imidazole(1:2:4)triazine. (Referring to the formula given above $R_1$ is hydrogen and $R_2$, $R_3$ and $R_4$ are phenyl.)

Example VII 2.5 g. 5:5-diphenyl-3-amino(1:2:4)triazine are heated under reflux for 10 hours with 2.5 g. desyl chloride and 50 cc. ethyl alcohol. The product separated by cooling and was crystallised from alcohol. Its melting point was 238°–239° C. The product is 4'.5'.5.6-tetraphenyl (2.3:2'.3')imidazole(1:2:4)triazine. (Referring to the formaula given above $R_1$, $R_2$, $R_3$ and $R_4$ are phenyl groups.)

What we claim is:
1. A compound of the general formula

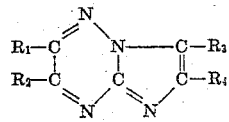

where $R_1$, $R_2$, $R_3$, and $R_4$ each indicates a member of the group consisting of nitrophenyl, phenyl and hydrogen.

2. A compound of the general formula set forth in claim 1, wherein at least two of the radicals $R_1$, $R_2$, $R_3$, and $R_4$ indicate phenyl.

3. A compounnd of the general formula set forth in claim 1, wherein at least one of radicals $R_3$ and $R_4$ indicates p-nitrophenyl.

4. A process for the production of a compound as set forth in claim 1, which comprises reacting a compound of the general formula

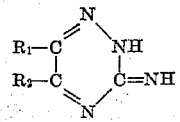

with an α-halocarbonyl compound of the general formula

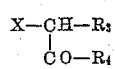

where $R_1$, $R_2$, $R_3$ and $R_4$ each indicates a member of the group consisting of hydrogen and p-nitrophenyl, and X is a halogen.

5. A process according to claim 4, wherein the compound of the first stated formula is 5-phenyl-3-amino-(1:2:4)-triazine or 5:6-diphenyl-3-amino-(1:2:4)-triazine.

6. A process according to claim 4, wherein the α-halocarbonyl compound is selected from the group consisting of α-bromo-acetophenone, α-bromo-p-nitro-acetophenone, α-bromophenyl acetaldehyde and α-chlorodesoxybenzoine.

7. A process according to claim 4, wherein the reaction is carried out using an equal molecular ratio between the reactions agents.

8. A process according to claim 4, wherein the reaction is carried out using an excess of one of the reagents.

9. A process according to claim 4, wherein the reaction is effected in the presence of an inert solvent.

10. A process according to claim 4, wherein the reaction is effected by heating the reaction mixture between 50° C. and the boiling point of the solvent.

11. A process according to claim 4, wherein the reaction is effected in the presence of a binding agent which is enert with respect to the α-halocarbonyl compound.

12. A process according to claim 11, wherein the binding agent is selected from the group consisting of an ankaline carbonate, bicarbonate and phosphate.

13. A process according to claim 4, wherein the reaction is carried out by heating the mixture for from five to fifteen hours.

14. As a new composition of matter, a fluorescent compound as set forth in claim 1.

References Cited in the file of this patent

FOREIGN PATENTS 536,121    Italy _____ Nov. 24, 1955

OTHER REFERENCES

Chemical Abstracts, vol. 50, column 10743, Abstract of Fusco et al.: Rend. ist. lombard sci., Pt. I, Classe Sci. mat. e nat. 88, 194–202 (1955).